Patented May 10, 1932

1,858,018

UNITED STATES PATENT OFFICE

LEON LILIENFELD, OF VIENNA, AUSTRIA

PROCESS FOR THE MANUFACTURE OF ETHERS OF CARBOHYDRATES

No Drawing. Application filed April 25, 1921, Serial No. 464,357, and in Austria May 5, 1920.

The manufacture of ethers of the carbohydrates having the empirical formula $nC_6H_{10}O_5$, such as cellulose, starch, dextrine and their conversion products and derivatives was heretofore effected, in so far as their alkali compounds were taken as starting material, by treating the carbohydrates, their conversion products or derivatives; firstly with caustic alkali solution and then subjecting the material so obtained to treatment with alkylating, aralkylating or arylating agents at suitable temperatures, after which the carbohydrate ethers so produced were isolated from the reaction mass. (See prior U. S. patent issued to me, No. 1,188,376.)

If moderate quantities of caustic alkali solution and alkylating, aralkylating or arylating agents were used, it was difficult to obtain a sufficiently complete etherification and the products obtained were of relatively little technical value. However, even if in producing alkali cellulose, quantities of caustic alkali were used, which were adequate for effecting a sufficiently complete alkylation, ethers were obtained, e. g. of cellulose), which when converted into technical products, such as artificial threads, films, plastic masses and the like, were not completely resistant to water.

The employment of such large quantities of caustic alkali solution and alkylating agent is a drawback, as it admits of only an uneconomical use being made of the apparatus; apart from this, work with large quantities of caustic alkali solution and of alkylating agents involves a great loss of material, as in many cases, it is practically impossible to recover the excess of alkali and the excess alkylating agent and in other cases far too great difficulties are involved.

It has now been found that ethers of complete utility can be obtained by the employment of relatively small quantities of alkali and alkylating agent if the carbohydrates are treated before alkylating, not, as heretofore, with solutions of caustic alkali but with solid caustic alkali either alone or in the presence of water or solutions of alkali. It has further been found that it is easy according to the present process to obtain ethers of cellulose, which may be formed into technical products, such as films, celluloid-like material, artificial threads, insulating material and the like possessing excellent water resisting properties.

For carrying out the process, the carbohydrates or the materials containing them, with advantage in a finely divided state, are treated, i. e., kneaded, rubbed down, mixed or the like, with solid caustic alkali, preferably in the pulverulent state, either alone or in the presence of just so much water or caustic alkali solution that a part at least of the caustic alkali remains undissolved at the room temperature. The procedure may be carried out either by adding to the solid caustic alkali, water or a solution of a caustic alkali and then the carbohydrate, or the carbohydrate may be mixed with the solid caustic alkali, water or caustic alkali solution being added if required. It is also possible to treat the carbohydrate with water or caustic alkali solution and then to incorporate the solid caustic alkali with the mixture. In all cases in which water or an unsaturated caustic solution is employed, the final mixture will contain a saturated solution of caustic alkali besides the undissolved caustic alkali. In all cases, where the work is carried out with the exclusion of air, e. g., in vacuo, or in an atmosphere of dry inert gas, a larger or smaller quantity of water can be taken up from the air. The treatment may take place either in the cold or under the action of heat, the choice of temperature depending both on the quantity of solid caustic alkali and the concentration of the caustic alkali solution and also on the result desired. If, for instance, the production of an alkyl derivative capable of the fullest technical utilization is desired, and relatively large quantities of solid caustic alkali are employed, or if the same with highly concentrated caustic alkali solutions are being employed, the treatment should only be carried out at moderate temperatures, preferably even with cooling. The carbohydrates treated with solid caustic alkali in the absence or presence of water or caustic alkali solution, if desired, before alkylating or aralkylating or arylating, may be freed partially or wholly, for instance, by drying in vacuo or in the air or the like, from the water that may adhere to them.

The alkylation itself and the working up of the reaction masses after the completion of the alkylation is carried out in the usual manner.

The present process admits of the further possibility of incorporating with the carbohydrates or the materials containing them in the first instance of only so much solid caustic alkali, with the addition of water or caustic alkali solution if necessary, in order to obtain by subsequent alkylation, an alkyl derivative of a lower stage of alkylation, whereupon the alkyl derivative so obtained is further alkylated by the addition of more caustic alkali and alkylating agent.

*Examples*

(1) 1.5 to 4 parts by weight of powdered caustic soda are mixed in a suitable apparatus (a mortar, shredding machine, kneading machine, mixing drum or the like) with 1 part by weight of finely divided cellulose, either in the air or in vacuo or an atmosphere of inert gas or the like until a uniform mass is obtained.

When air is admitted during the working, the mass usually absorbs water during the mixing process.

The mixed product is treated, either directly after being made or after standing for a shorter or longer time in a known manner with alkylating, aralkylating or arylating agents.

(2) To 0.5 to 3 parts by weight of water or a 40 to 50% caustic soda solution 1 to 4 parts by weight of powdered caustic alkali are added and the whole is well mixed by hand or by means of suitable appliances. (Of course it is to be understood that within the stated range, a proportion must be maintained whereby some of the caustic alkali will remain undissolved, at room temperature).

In a suitable apparatus (mortar, kneading machine, shredding machine or the like) this mixture is mixed with 1 part by weight of finely divided cellulose and is kneaded up or rubbed up with it with cooling or at room temperature until a uniform mass is obtained.

This product is then treated, either directly after being made or after standing for a shorter or longer time, in a known manner with alkylating, aralkylating or arylating agents.

(3) To 4 to 9 parts by weight of a 40 to 50% caustic soda solution are added 1 to 4 parts by weight of powdered caustic soda and the whole is well mixed by hand or by means of a suitable appliance.

(Of course it is to be understood that within the stated range, a proportion must be maintained whereby some of the caustic alkali will remain undissolved, at room temperature.)

In a suitable apparatus (mortar, kneading machine, shredding machine, or the like) there is added to this mixture 1 part by weight of finely divided cellulose and it is kneaded or rubbed with it, with cooling at room temperature, or with the application of heat until a uniform mass is obtained.

This product is thereupon treated, either directly after it is made or after standing for a shorter or longer period of time, in known manner with alkylating, aralkylating or arylating agents.

Reference is made in the above examples to allowing the mixture of cellulose with the alkali and water to stand a while before the etherifying step. This standing constitutes an ageing operation and leads to the production of ethers having more desirable properties.

Examples for the other carbohydrates need not be specially given.

It is of course to be understood that in the appended claims, by the term "carbohydrates having the empirical formula $nC_6H_{10}O_5$," are intended to be covered the carbohydrates or materials containing them, or their conversion products or derivatives, as in the prior Patent No. 1,188,376.

The etherification of the cellulose by treating a mixture thereof with alkali and water in the proportions described herein and in my applications Nos. 436,604 and 537,062, with etherifying agents, is claimed in my copending case Serial No. 611,516 filed January 8, 1923, the claims of the present application including the ageing step. The making of such mixtures of cellulose with alkali and water in the proportions above stated is claimed in my copending case 436,604 filed January 11, 1921, and the mechanical mixing of the cellulose, water and alakali, and the absorption of moisture from the air during such mixing operation are claimed in my copending case 537,062 filed February 16, 1922.

What I claim as my invention and desire to secure by Letters Patent is:—

1. The process of making cellulose ethers, which comprises intimately mixing cellulose, water, and alkali, the cellulose and alkali being substantially in the proportions for the etherifying reaction, and the water being in proportion no greater than that required for said reaction, ageing the resulting mixture and then treating said mixture with the etherifying agent.

2. The process of making cellulose ethers, which comprises intimately mixing cellulose, water, and alkali in the proportions for the etherification reaction at not substantially above room temperature, ageing the resulting mixture, and then treating with the etherifying agent.

3. The process of making cellulose ethers, which comprises intimately mixing cellulose, water, and alkali, the cellulose and alkali being substantially in the proportions for the etherifying reaction, and the water being in proportion no greater than that required for said reaction, without subjecting the cellulose to heating during such operation and without driving off water therefrom, ageing the resulting mixture and then treating said mixture with the etherifying agent.

4. The process of making cellulose ethers, which comprises intimately mixing cellulose, water, and alkali in the proportions for the etherification reaction, without subjecting the cellulose to heating during such operation and without evaporating any substantial amounts of water therefrom, ageing the resulting mixture, and then treating said mixture with the etherifying agent.

5. The process of making ethers of a carbohydrate having the empirical formula $n(C_6H_{10}O_5)$ which comprises intimately mixing such a carbohydrate, water and alkali, the said carbohydrate and alkali being in the proportions for the etherifying reaction, and the water being in proportion no greater than that required for said reaction, aging the resulting mixture and then treating said mixture with an etherifying agent.

6. The process of making ethers of a carbohydrate having the empirical formula $n(C_6H_{10}O_5)$ which comprises intimately mixing such a carbohydrate, water, and alkali in the proportions for the etherification reaction at not substantially above room temperature, aging the resulting mixture, and then treating the same with an etherifying agent.

In testimony whereof I have signed my name to this specification.

Dr. LEON LILIENFELD.